United States Patent
Clarke et al.

(10) Patent No.: US 7,017,012 B2
(45) Date of Patent: Mar. 21, 2006

(54) DISTRIBUTED STORAGE CACHE COHERENCY SYSTEM AND METHOD

(75) Inventors: Kevin J. Clarke, Princeton, MA (US); Steve McPolin, Nepean (CA); Robert Gittins, Westminster, CO (US); Anton Rang, Houlton, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 209 days.

(21) Appl. No.: 10/177,944

(22) Filed: Jun. 20, 2002

(65) Prior Publication Data

US 2003/0236950 A1  Dec. 25, 2003

(51) Int. Cl.
*G06F 12/00* (2006.01)
(52) U.S. Cl. ...................................... 711/141; 711/156
(58) Field of Classification Search ................ 709/214; 711/120, 124, 141, 148, 156
See application file for complete search history.

(56) References Cited

U.S. PATENT DOCUMENTS

| | | | | |
|---|---|---|---|---|
| 4,622,631 A | * | 11/1986 | Frank et al. ................. | 707/201 |
| 4,755,930 A | * | 7/1988 | Wilson et al. ............... | 711/122 |
| 5,226,144 A | * | 7/1993 | Moriwaki et al. ........... | 711/121 |
| 5,313,609 A | * | 5/1994 | Baylor et al. ................ | 711/121 |
| 6,519,685 B1 | * | 2/2003 | Chang ......................... | 711/141 |
| 2002/0004886 A1 | * | 1/2002 | Hagersten etal. ........... | 711/141 |

* cited by examiner

*Primary Examiner*—Chirstian P. Chace
(74) *Attorney, Agent, or Firm*—Martine Penilla & Gencarella LLP (57) ABSTRACT

In a computer system, a distributed storage system having a data coherency unit for maintaining data coherency across a number of storage devices sharing such data is described. The data coherency unit includes logic to monitor data transition states in each of the data storage devices to detect when the processing status of data being shared by two or more of the storage devices changes. The data coherency unit advantageously ensures a status change in shared data in one storage device is broadcast to other storage devices having copies of the data without having each storage device independently monitor adjourning storage devices to detect data state changes.

23 Claims, 11 Drawing Sheets

R: Requestor
S: Local Storage
S': Remote Storage
D: Permanent Storage

Delete Operation

Create Operation

R: Requestor
S: Local Storage
S': Remote Storage
D: Permanent Storage

DISTRIBUTED STORAGE CACHE COHERENCY SYSTEM AND METHOD

FIELD OF THE INVENTION

The present claimed invention relates generally to the field of computer storage systems. More particularly, embodiments of the present claimed invention relate to a distributed storage cache coherency system for maintaining data consistency over a distributed networked storage system.

BACKGROUND ART

The use of distributed computer systems has been gaining mass appeal over the last few years. The need for enterprises to more effectively use corporate resources and the desire to locate employees at various remote locations from corporate headquarters, pose challenges for most system administrators. In these distributed network systems, the need to share data between various departments and project groups is paramount. Changes in computer interconnect technology are creating new possibilities for other computer architecture.

Figure 1:
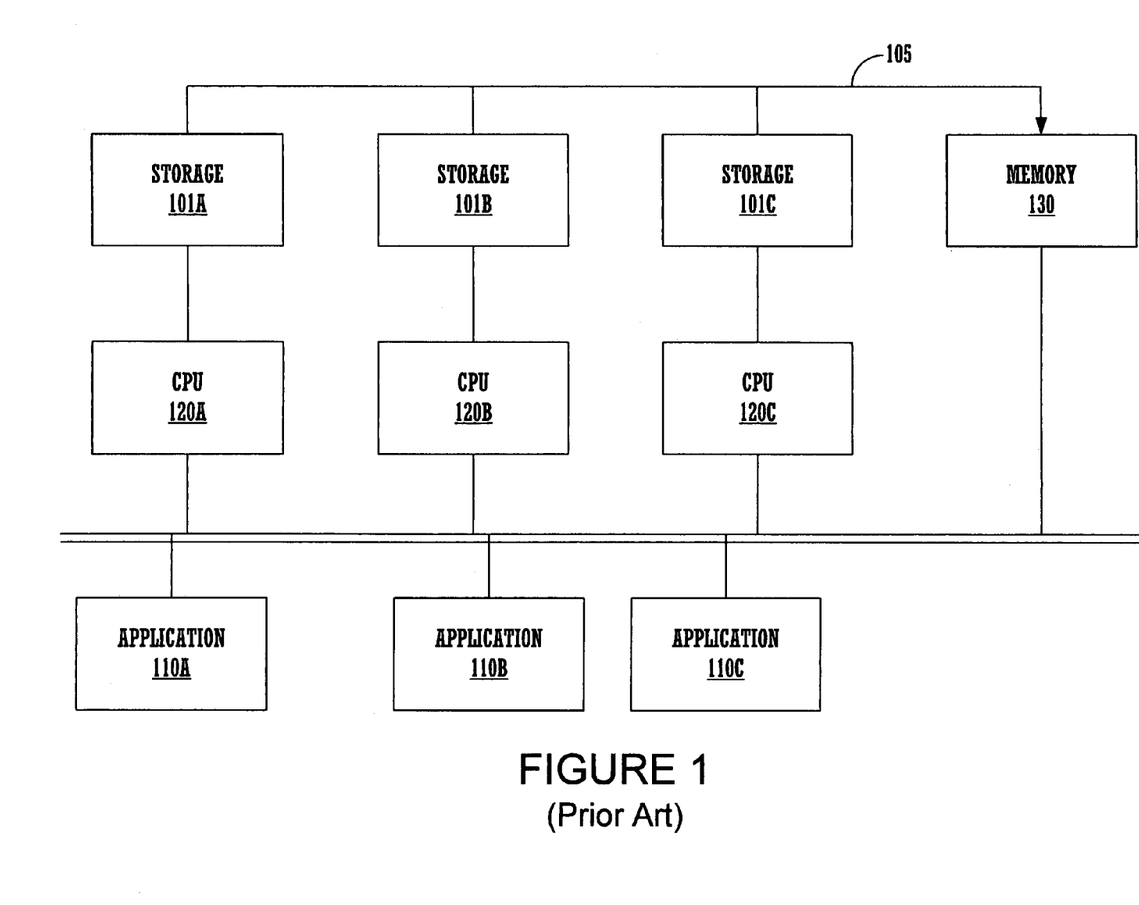
FIG. 1 is a block diagram of a prior art computer system.

These new high performance devices make it possible to distribute workload among a set of devices that cooperate in a peer level relationship. These devices jointly collaborate to provide services that were once isolated to a single machine. FIG. 1 is a prior art multi-processor computer system comprises a plurality of storage devices (cache) 101A–101C, a plurality of processors 120A–120C, a shared main memory 130 and a plurality of applications 110A–110C. In the prior art system shown in FIG. 1, each processor has its own cache. The cache units are all connected to main memory 130 by way of the network 105. In operation, when any one of applications 110A–110C requires data from either one of the storage units 110A–101C, the application sends a read request to the processor corresponding to the storage unit being accessed.

In the system shown in FIG. 1, whenever a processor requires to read or write a data item, it sends the address of that item to its cache unit. If the required data is present in the cache, it can be accessed immediately by the process unit. Whenever one of the processors updates a data item in its cache unit, the cache generates an update message over the network 105, to the memory 130.

This ensures that the data in main memory 130 is constantly kept updated. Each cache unit continuously monitors the network for any update messages from the other cache units. Whenever a cache detects such a message, it checks to determine whether the updated item is present in the cache and, if so, invalidates it. This prior art method of each cache unit monitoring the bus lines is generally referred to as a snooping protocol.

During an intermediary processing period, updates that occur in one data storage unit may not immediately occur in a corresponding storage unit (e.g., 101A–101C). This means that applications having data spread over one or more of the storage devices will not be able to have updated data available to them during such intermediary processing period.

The lack of storage coherency means that each time any application updates data in one storage unit, other applications will not have updated data during some part of its processing period. In order for the processing of data to proceed in a rational and predictable fashion, the intermediate states of the data must be known to all the applications that share the data. Each application's view of the state of the data should be kept coherent so that the sum of the distributed states will comprise the entire state of the workload at any given time.

SUMMARY OF INVENTION

Accordingly, there is provided a multiprocessor, multi-data storage distributed system comprising a data coherency unit that provides a mechanism for shared data to be updated between any of the multi-storage units without having to individually snoop address or data lines to detect data updates in adjacent storage units within the distributed system.

What is described herein is a computer system having a data coherency unit that implements a technique for maintaining shared data coherency over a distributed network system having a plurality of data storage devices. Embodiments of the present invention allow applications to access a particular data storage unit from a group of storage devices, update the data contents of the particular storage device and simultaneously update the contents of adjacent storage devices sharing the same data. The present invention allows controlling storage device to manipulate data that is shared with other storage devices without having to monitor address lines to update the storage devices sharing the manipulated data.

Embodiments of the present invention also include a data coherency module for providing a coherency scheme for maintaining data consistency over the distributed data storage units for data shared between the storage units. The data coherency module monitors the storage units in the distributed network to determine when a transition state of data shared by two or more of the distributed storage units changes. By monitoring the transition state changes of the shared data, the data coherency unit is able to broadcast data changes over the distributed network to the storage units sharing the data.

Embodiments of the present invention also include a data coherency manager that couples to a storage device to provide data state transition management of data in the storage device. The coherency manager allows each storage device to inform other storage devices in the network about the need to perform a given state transition to data being shared by the storage devices.

Embodiments of the coherency module of the present invention also include a messaging module that allows the data coherency module to broadcast data state transitions in one storage device to all affected storage devices sharing the data. By using a broadcast mechanism, the data coherency module provides data coherency across several storage devices without having each individual device monitoring address or bus lines of the others to detect data changes.

Embodiments of the coherency module of the present invention further include a data lookup module for monitoring each storage device in the network to detect when a particular storage device performs data lookup operations on data shared by two or more of the storage devices. Monitoring the storage devices for data lookup operations ensures that only one of the storage devices has control of modifying the data at any given time.

Embodiments of the coherency module of the present invention further include a data delete module for monitoring each storage device in the network to detect when a particular storage device performs a delete operation of a particular shared data object. By monitoring such delete operations, the delete module ensures that copies of shared data deleted by a requesting application are removed from all storage devices sharing the data.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process data in a computer system. In accordance with an aspect of the invention, a data coherency system provides a distributed computer storage system with the ability to maintain data coherency of shared data between two or more storage devices.

The word "data" is used throughout the description to indicate binary information. In some instances "data" is used in a generic sense to include, for example, constants, instructions or countless other data fields and types stored in memory. In the currently preferred embodiments of the present invention, instructions and data are stored separately in the storage units.

Figure 2:
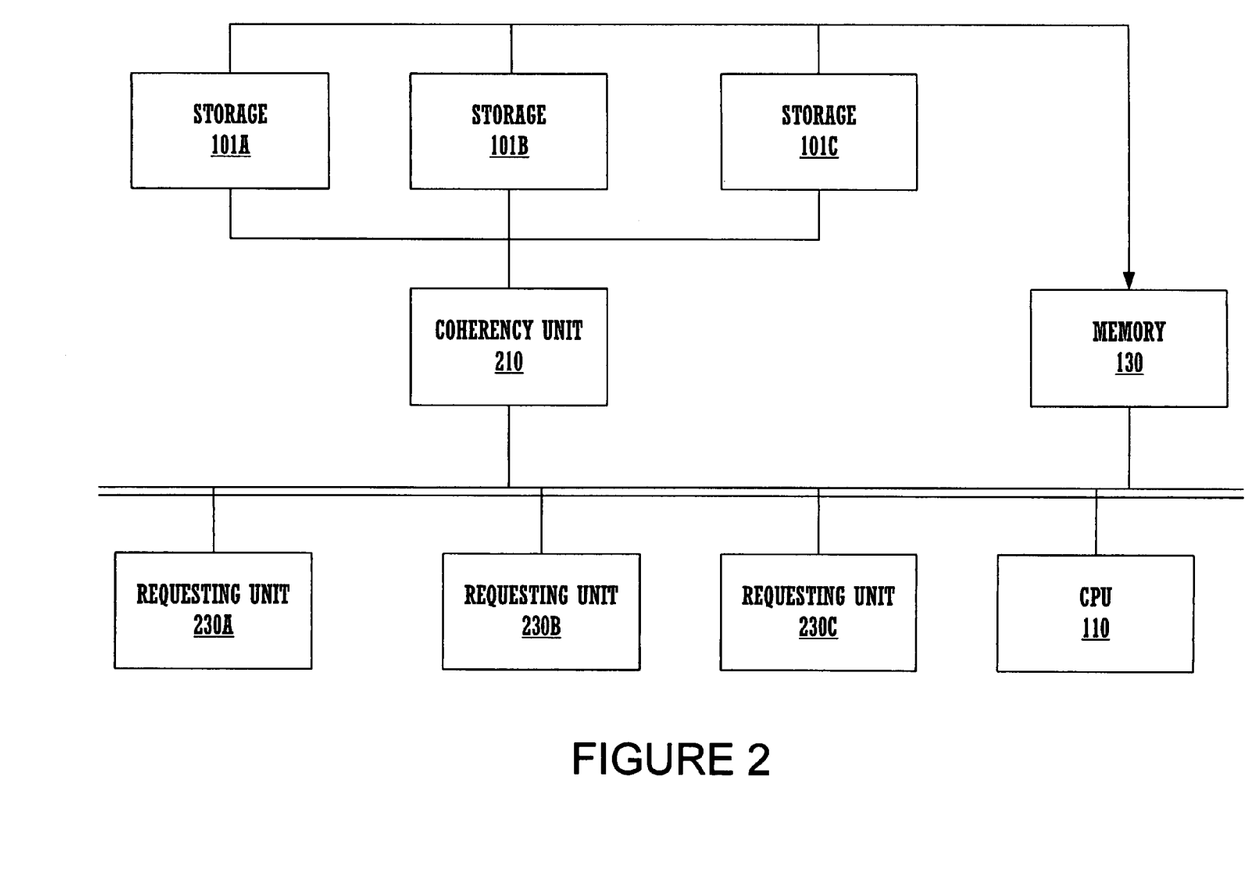
FIG. 2 is a block diagram of a computer system in accordance with an embodiment of the present invention.

FIG. 2 is a block diagram illustration of one embodiment of a computer system 200 of the present invention. The computer system according to the present invention comprises a plurality of storage devices 101A–101C, a central processing unit (CPU) 110, a data coherency unit 210, main memory 130, and a plurality of requesting units 230A–230C. In one embodiment of the present invention, the requesting units 230A–230C comprise a host computer node having a plurality of application programs. In another embodiment of the present invention, the requesting units comprise a plurality of application programs.

The storage units 101A–101C are coupled to the data coherency unit 210 through a high speed bus that allows the storage units 101A–101C to share data. The storage units 101A–101C do not have to monitor the address or bus lines of adjacent storage unit to detect data updates of shared data among different units. In one embodiment of the present invention, the storage units 101A–101C are caches for temporarily storing data being processed for storage in the main memory 130.

The data coherency unit 210 provides a software based mechanism for the storage units 101A–101C to maintain data consistency and coherency between different storage units connected to the data coherency unit 210. The data coherency unit 210 provides a single point of update detection for shared data updates and accordingly notifies the respective storage units 101A–101C to update their contents in response to data state changes/updates, etc. In one embodiment of the present invention, the data coherency unit 210 provides a broadcasting mechanism to notify the affected storage units being referenced by a data transaction to update the status of shared data stored in the storage units 101A–101C.

In operation, when an application or a processor requires a data item in a target (or source) data storage unit, the requesting unit sends the request to the target storage unit and gains exclusive control of the data. The target storage unit then becomes the source node for the data accessed. As the data is manipulated, the copy of the data in the other storage units becomes invalid.

Figure 7:
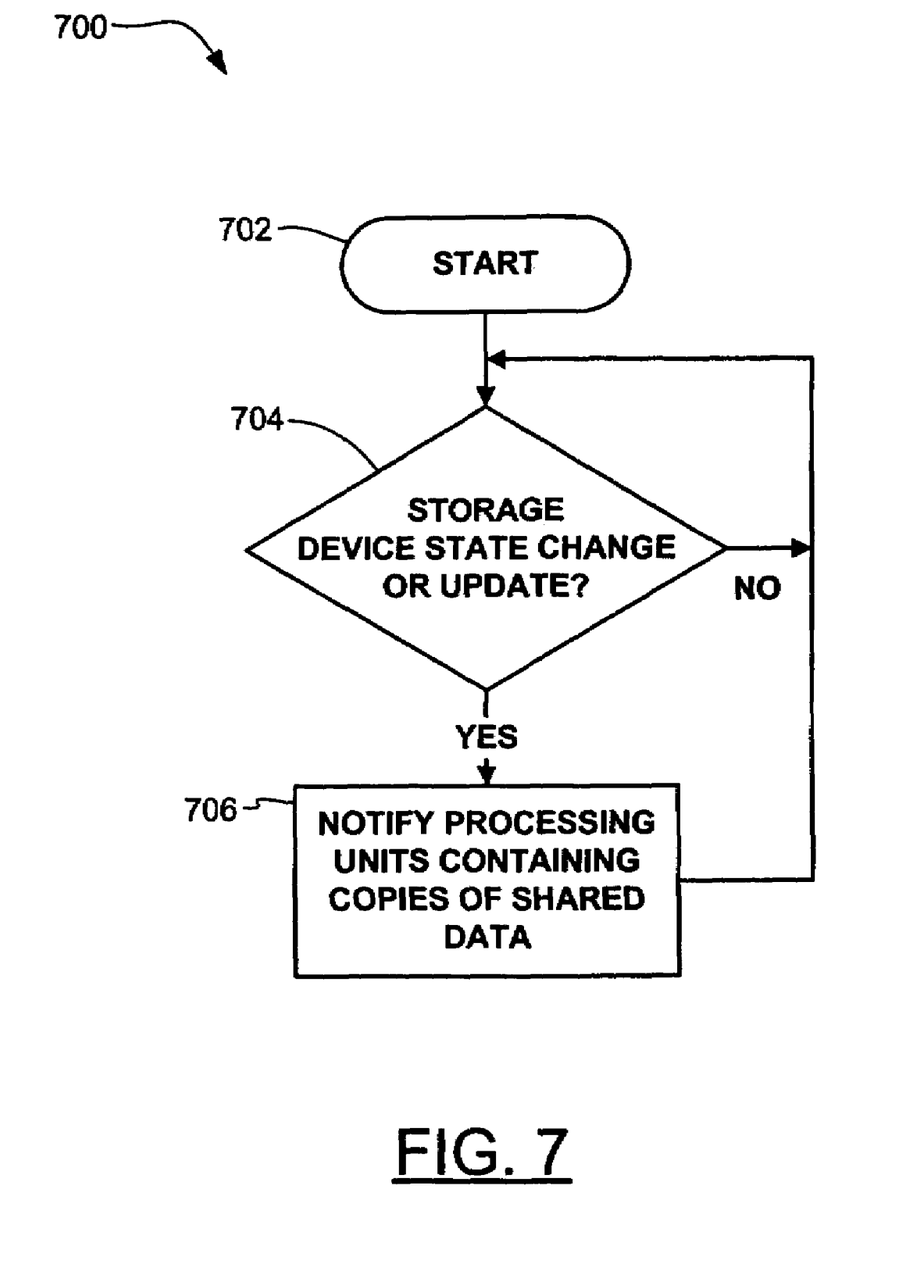
FIG. 7 is a flow chart depicting an exemplary operation of a coherency management system.

FIG. 7 shows a flow chart 700 depicting an exemplary operation of a coherency management system. The procedure begins as indicated at starting block 702 and flows to operation 704 wherein it is determined whether a change in state or update of a storage device is detected. If not, then the procedure returns to operation 704 until such a change is detected.

If a change in state or update of a storage device is detected in operation 704, then the procedure flows to operation 706 wherein processing units containing copies of shared data are notified. After operation 706, the procedure returns to operation 704 to monitor the storage devices.

After the request has completed processing the data, the source node updates the contents of the data. The coherency unit continuously monitors the various storage units 101A–101C to detect state changes of the data and for updates of data from each of the storage units. The coherency unit 210 upon noticing the change in the data notifies each of other storage units that share the same data to update their respective copies of the data.

Figure 3:
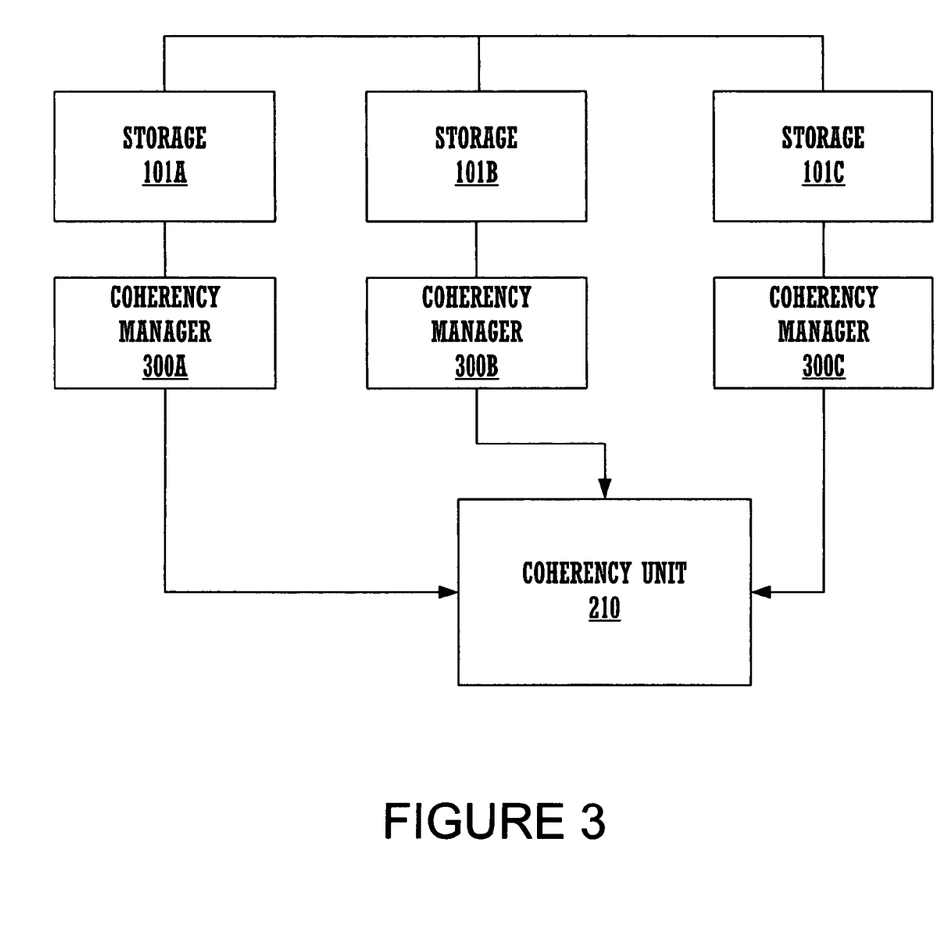
FIG. 3 is block diagram illustration of one embodiment of a data storage coherency system of one embodiment of the present invention.

FIG. 3 is a block diagram illustration of one embodiment of the data coherency environment. The data coherency environment comprises the data coherency unit 210, the storage units 101A–101C and coherency managers 300A–300C. The coherency managers 300A–300C couple to corresponding respective ones of the storage units 101A–101C.

The coherency managers 300A–300C communicate with the data coherency unit 210 to maintain data coherency in each respective storage unit 101A–101C. The coherency managers 300A–300C provide the storage units 101A–101C with data that associates data state with any data object stored in the storage units 101A–101C. The coherency managers 300A–300C manage the state transitions in each respective storage unit and inform the various cache about the need to perform a given transition. This state is manipulated and referenced by the data coherency unit 210.

Figure 4A:
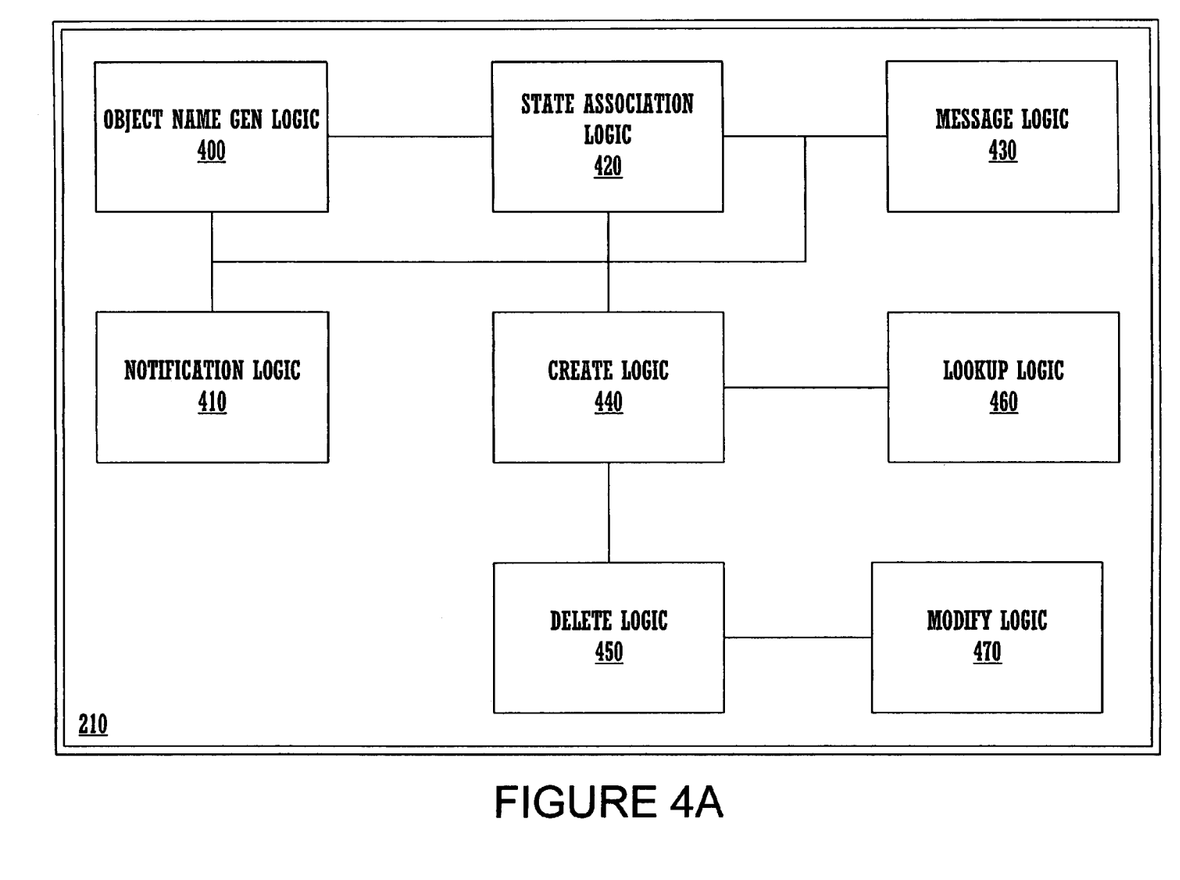
FIG. 4A is a block diagram of an embodiment of the distributed storage cache coherency unit of the present invention.

Reference is now made to FIG. 4A which is a block diagram illustration of one embodiment of the data coherency unit 210 of the present invention. The data coherency unit 210 comprises named object generator 400, notification module 410, state machine module 420, message module 430, data create module 440, data delete module 450, look up module 460 and data modification module 470. The data coherency unit 210 is connected to the computer system 200 via all the distributed storage units 101A–101C.

In one embodiment of the present invention, known protocols are used to describe the various data transition states. In the following description, the known protocols write-through, write-back and write-once are discussed. In this connection the letters "M", "S", "E", and "I" are used. For write-once protocol "I" indicates that the data is invalid, "S" indicates that the data is shared and "E" indicates that the data is exclusive, that is, the data is only controlled by one storage unit and not by the other storage units in the network. "M" indicates that the data is modified and that the data in the other storage units are incorrect.

The named object module 400 generates named data objects requested by applications or devices communicating with a storage unit. A copy of the named data object is stored in each storage unit that shares the data. A shared data object can be manipulated by only one storage unit at any given time.

The notification module 410 notifies storage units sharing the named data object that is accessed by a requesting unit seeking to process the object. In the present invention, the coherency unit 210 tracks all requests by the requesting units to the storage units 101A–101C to detect state changes in the status of the data object. The messaging module 430 broadcasts state changes to the storage units sharing named data objects that have been processed (e.g., either updated, modified or deleted) by one or more of the requesting units.

Broadcasting the state changes of the named data objects enables the storage units not controlling the data object to update their respective copies of the data object when the state change occurs. The state machine module 420 monitors the various transitions states of data accessed in each of the storage units 101A–101C that couple to the data coherency unit 210.

These states may include an invalid state when the correct data of the named data object may be in one or more of the storage units, but is not in the target storage unit. An exclusive state describes a state when the requesting unit accessing data in the storage unit has sole control over the processing of the data to the exclusion of the other storage units that may share the accessed data.

A modification state represents a state in which the requesting unit modifies the data accessed from the target storage unit. The modification state means that only the copy of the data in the requesting unit accessing the data from the target storage unit has an up-to-date copy of the data while the copies in the other shared storage units are incorrect.

Data may be modified by either an update or a deletion from the target storage unit. Once the requesting unit has completed manipulating data accessed from the target storage unit, the data state transition to a shared state is made available to all the storage units that require copies of the data.

In one embodiment of the present invention, the named data object's state has a pointer to adjoining data sharing storage units. Each sharing storage unit also points to other sharing storage units in the network to form a chain of storage units. On a state change notification, the chain is followed until all instances of the stored data object are notified to change their states to perform the appropriate action. In another embodiment of the present invention, a double chaining mechanism is used to ensure that all storage units in the distributed system are notified, especially in cases where a storage unit in the chain is unavailable for notification at the time when the target data is updated.

Still referring to FIG. 4A, the data coherency unit 210 uses the create logic 440 to monitor the various storage units to determine when a storage unit creates new data objects and broadcasts the newly created data objects to the storage units that will share the data to update their contents. In one embodiment of the present invention, the create data object operation is performed by the requesting units. The data coherency unit 210 therefore asserts a lock in the storage data object definition. The following exemplary logic implements the lock assertion operation in one embodiment of present invention:

```
Struct cache_o_mat {
    Krwlock_t rwlock;      /*protects this data structure */
    Homenode_t node_hdl; / the originating node, the member */
    Struct state_t_state;   /*the state of this item */
    Void data;              / the actual thing to cache */
};
```

The delete logic module 450 monitors the storage units to detect when a particular storage unit wishes to delete a shared named data object. The data coherency unit 210 broadcasts to all storage units sharing data targeted for deletion. Similarly, the modify logic module 470 monitors the storage units to detect when a particular storage unit modifies data shared by other storage units. The data coherency unit 210 notifies all storage units sharing a particular modified data object to update their copy of the modified data.

The lookup logic module 460 provides lookup monitoring for the storage units. Because the present invention does not implement the address lines snooping protocol of the prior art to watch for address transactions, the data coherency unit 210 implements a broadcast scheme to implement the lookup of data objects from the storage units. If a portion of the system does not know that a given named object does not exist during a lookup, all the storage units are contacted to seek the information.

Figure 4B:
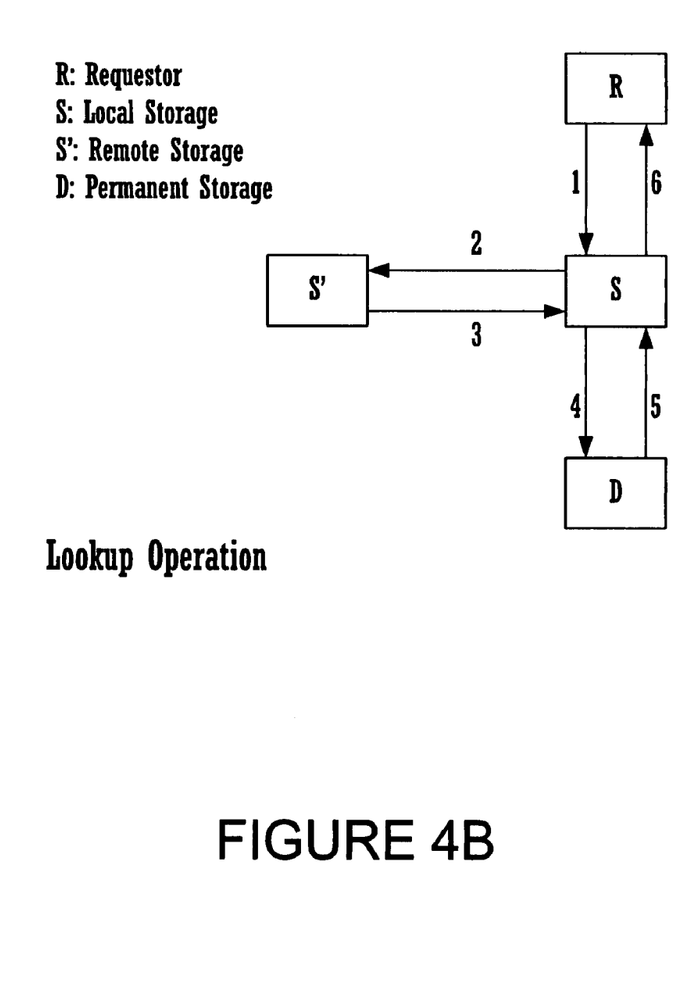
FIG. 4B is a state diagram illustration of one embodiment of a lookup operation of the present invention.

FIG. 4B is a block diagram illustration of one embodiment of a lookup operation of the present invention. In the lookup illustration shown in FIG. 4B, the lookup operation uses two preconditions to implement the lookup scheme of the present invention. The lookup preconditions include: (1) holding read lock on parent; and (2) holding read lock on object. The example illustrated in FIG. 4B assumes a lookup scenario with a requesting unit (R), a local storage unit (S), a remote storage unit (S') and a permanent storage device (D).

There are six states of operation during a lookup operation. During state 1, the requesting unit "R" sends a lookup request to the local storage unit "S". If the requested data is not present in the local storage unit "S", the data coherency unit 210 checks the remote storage unit "S'" during state 2. In state 3, if the requested data is found in the remote storage unit "S'", the data is presented to the requesting unit "R" via the local storage unit "S".

In state 4, if the requested data is not in the remote storage unit "S'", the coherency unit 210 checks the permanent storage unit "D" for the requested data. In state 5, a hit in the permanent storage unit "D" results in the coherency unit 210 upgrading the write lock on the parent and presenting the lookup data, in state 6, to the requesting unit "R" via the local storage "S".

Figure 4C:
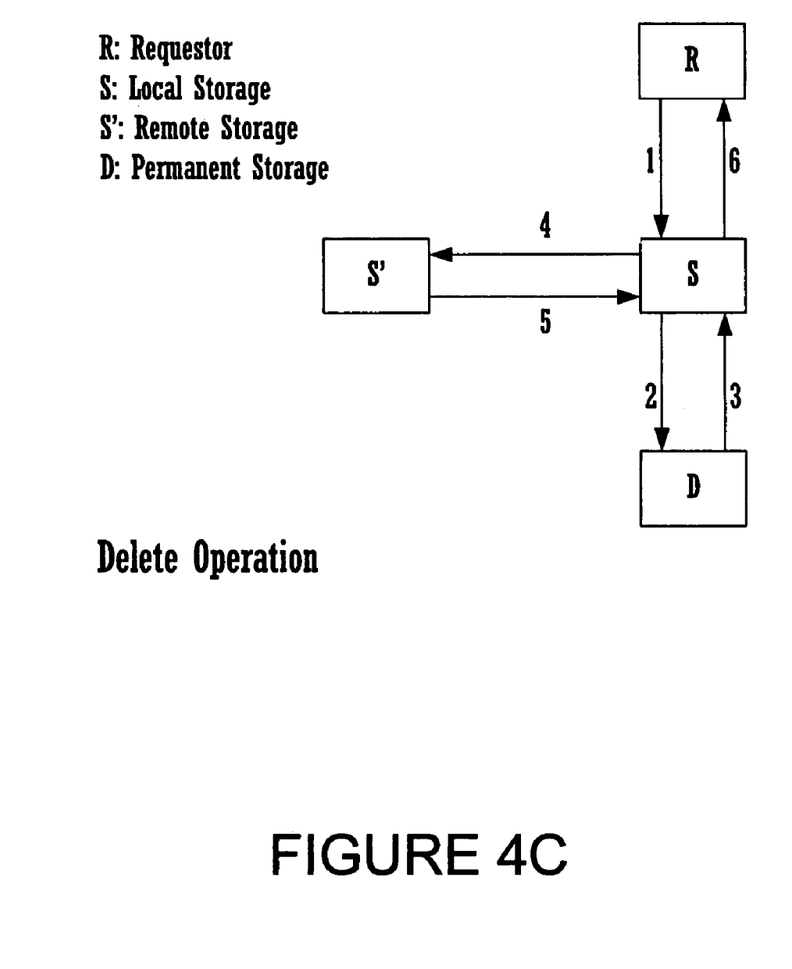
FIG. 4C is a state diagram illustration of one embodiment of a delete operation of the present invention.

FIG. 4C is a block diagram illustration of one embodiment of a delete operation of the present invention. In the example shown in FIG. 4C, the delete operation requires two preconditions. The first being a write lock on the parent and the second being a write lock on a data object. In the example shown in FIG. 4C, the requesting unit "R" submits a delete request first to the local storage unit "S" during state 1.

The coherency unit 210 deletes the copy of the data in the local storage unit "S" from the permanent storage device "D" during state 2. In state 3, a delete complete notice is sent to the local storage unit "S" and copies of the deleted data are subsequently deleted from the remote storage units "S'". In state 6, the requesting unit "R" is notified of the completion of the delete operation.

Figure 4D:
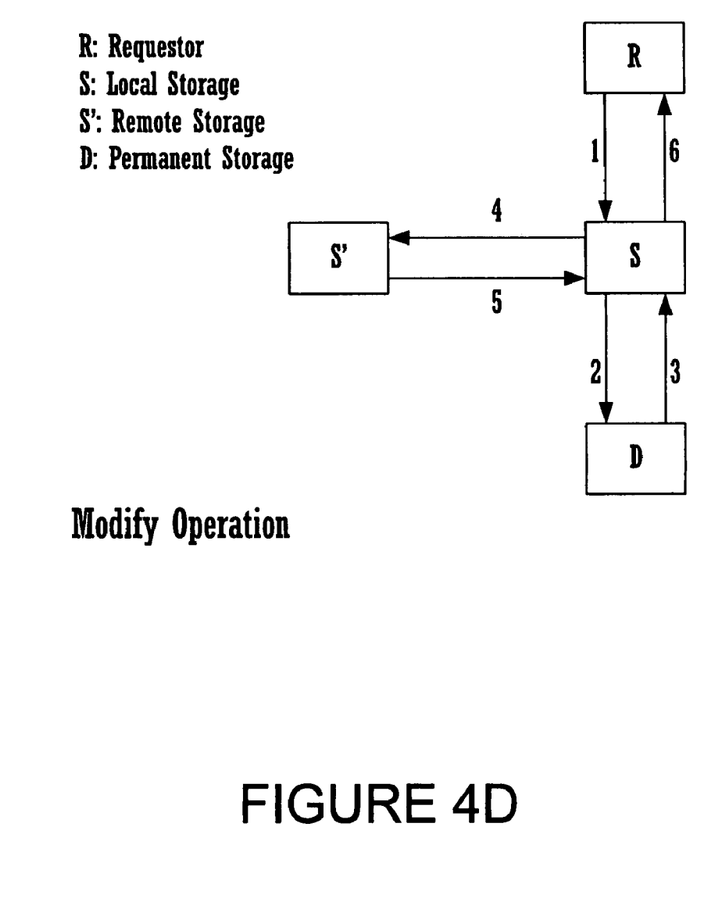
FIG. 4D is a state diagram illustration of one embodiment of a modify operation of the present invention.

FIG. 4D is a block diagram illustration of an exemplary embodiment of the modify operation of the present invention. In the example shown in FIG. 4D, in state 1, the requesting unit "R" initiates a modify request to the local storage unit "S". In state 2, the copy of the data being modified is modified in the permanent storage device "D".

In state 3, a copy of the modified data from the permanent storage device "D" updates the local storage unit "S". In state 4, a copy of the data in the local storage unit "S" is used to update the remote storage units "S'". In state 5, the remote storage units "S'" acknowledge completion of the data updates and in state 6, the requesting unit "R" is notified of the completion of the modification process.

Figure 4E:
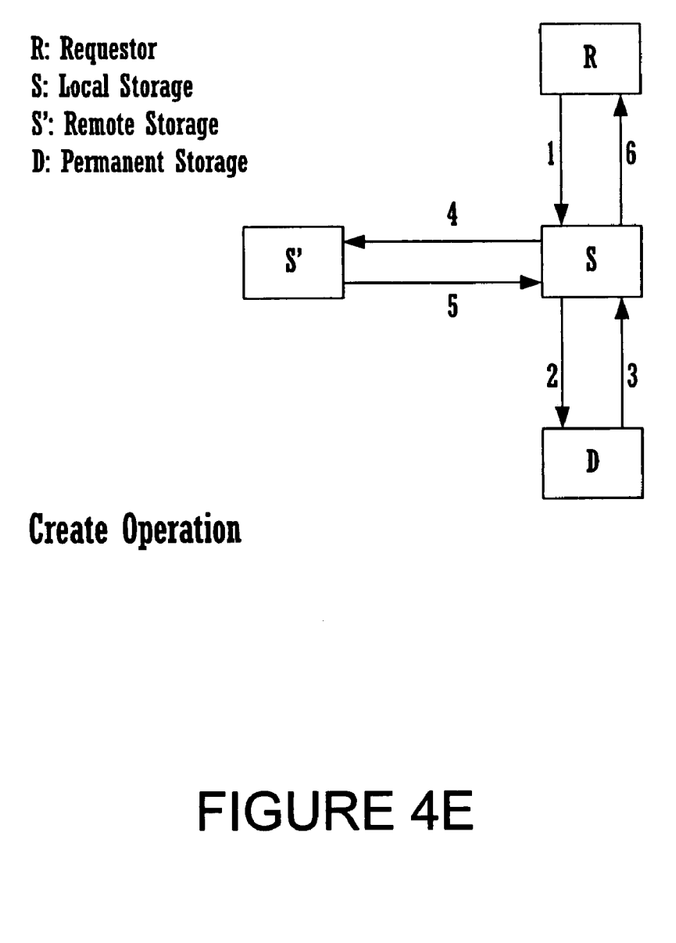
FIG. 4E is a state diagram illustration of one embodiment of a data create operation of the present invention.

FIG. 4E is a block diagram illustration of an exemplary embodiment of the create operation of the present invention. As shown in FIG. 4E, during state 1, the requesting unit "R" submits a create request to the local storage unit "S". The create request is recorded on permanent storage device "D" in state 2. Once completed (state 3), the remote storage units "S'" are notified (state 4). When all remote units have acknowledged the create (state 5), the original requester is notified (state 6).

Figure 5:
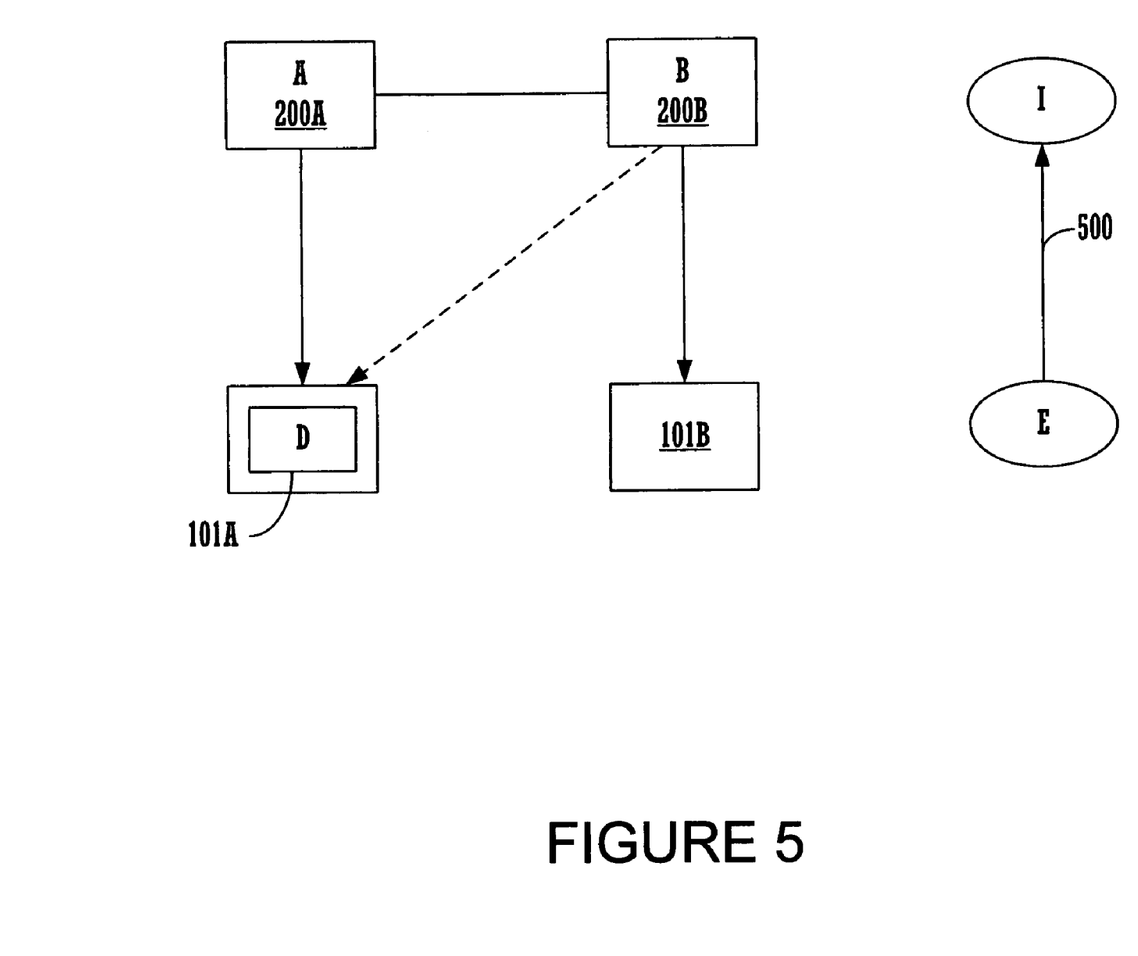
FIG. 5 is a state diagram of one embodiment of the storage coherency processing of data of the present invention.

FIG. 5 is a state diagram of one embodiment of the storage coherency processing of the present invention. The state diagram shown in FIG. 5 assumes host requesting units unit 200A ("host A") and host requesting unit 200B ("host B") which contain the present data coherency invention and its associated logic. In the example shown in FIG. 5 host A creates a named data object and places it in the storage unit 101A. When the host A creates the data object host A will have exclusive control over the data e.g., the data will be in an exclusive "E" state 500 as shown in the state diagram.

When host A has exclusive control of the data object, host B is aware of the presence of the data object because both host A and B share data stored in storage unit 101A. However, host B will not have control (e.g., will not be able to manipulate the data) over the data and the data will therefore appear as invalid to host B and other storage units coupled to the network.

Thus, for storage unit 101A in this state, host A has exclusive control to the data being created and updated. There is a local read/update in storage unit 101A. The data will appear invalid to other storage units in the distributed storage system 200.

Figure 6:
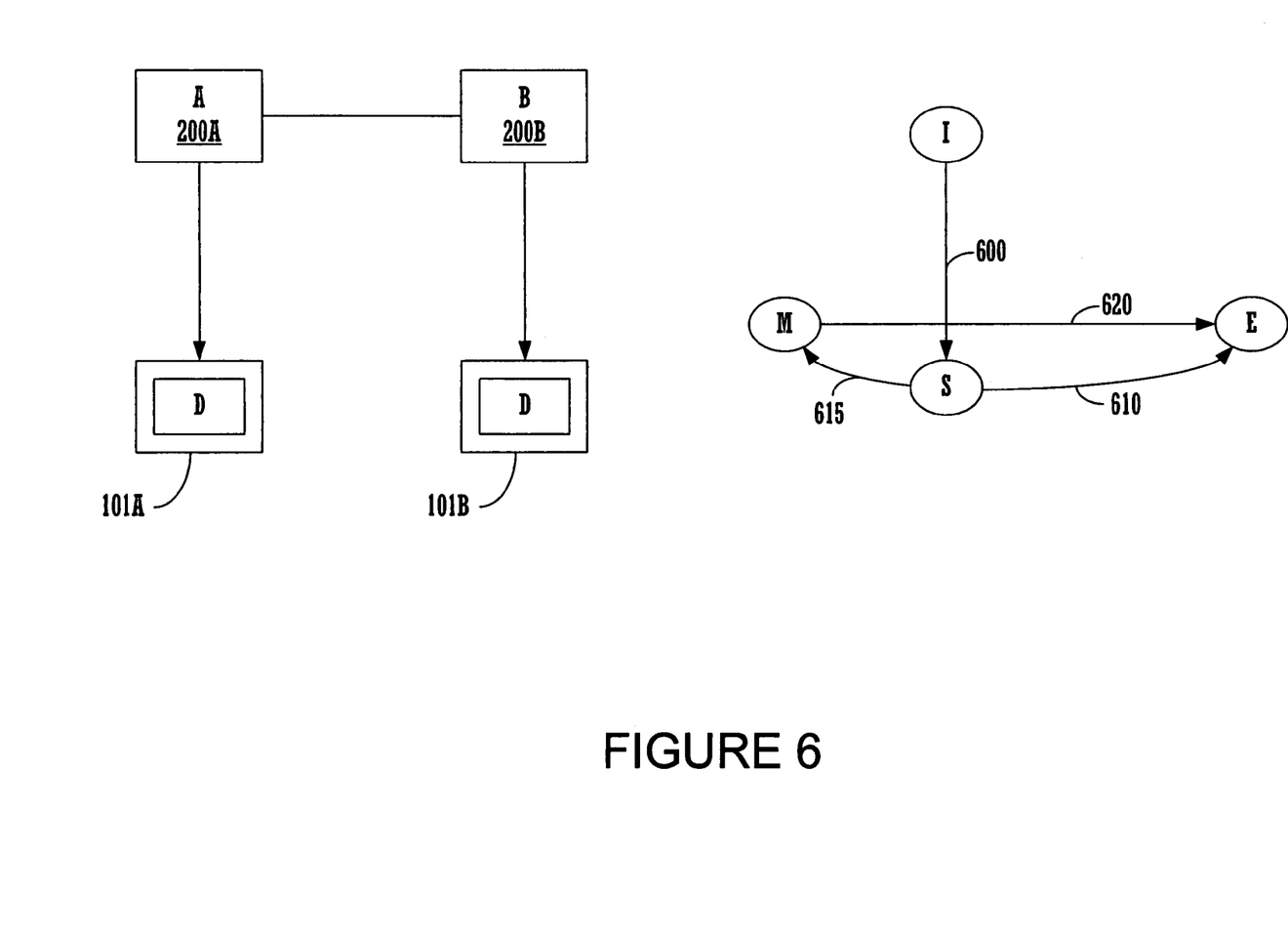
FIG. 6 is a state diagram of one embodiment of a write through operation of the present invention.

Referring now to FIG. 6, the two exemplary hosts A and B are shown having access to the same data object in their respective storage units 101A–101B. In the example shown in FIG. 6, the state of the data transitions from an invalid "I" state and remains in a shared "S" state in the storage units 101A–101B. In the shared state, the two hosts (A-B) each has access to the data.

The data is placed in an exclusive "E" state as indicated by arrow 610 once either one of host A or B solely gains control of their respective copies of the data. Similarly, the data could transition from the shared "S" state to the modification "M" state as indicated by arrow 615 if one of the hosts gain control of the data and attempts to modify or update the data. When the modification hit occurs, the data transitions into an exclusive state as indicated by arrow 620 with respect to the controlling host. In the exclusive "E" state, the data will appear to be invalid to the other storage units in the network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A computer system, comprising:
   a plurality of processing units;
   a main memory;
   a plurality of storage devices in communication with said main memory and with said plurality of processing units; and
   a storage data coherency management system to provide data coherency between said plurality of storage devices containing copies of shared data, said coherency management system monitoring said plurality of storage devices and detecting state changes and data updates to said copies of shared data, wherein said coherency management system notifies ones of said plurality of said processing units that contain said copies of said shared data of said state changes and said data updates when said state changes and said data updates occur, such that said plurality of storage devices are not required to monitor either of address and bus lines of adjacent ones of said plurality of storage devices to detect data updates of shared data among different ones of said plurality of storage devices.

2. The computer system of claim 1, wherein said shared data comprise named data objects, and wherein said storage data coherency management system comprises an object name generation module that generates named data objects requested by applications in communication with one of said plurality of storage devices.

3. The computer system of claim 1, wherein said shared data comprise named data objects, and wherein said storage data coherency management system further comprises a notification module that notifies said ones of said plurality of storage devices that a given named data object was accessed by a requestor seeking to process the object.

4. The computer system of claim 1, wherein said shared data comprise named data objects and wherein said storage data coherency management system further comprises a state machine module that monitors transition states of said named data objects as said named data objects are accessed from said plurality of storage devices by said plurality of processing units, said transition states including at least an invalid state, an exclusive estate, and a modification state.

5. The computer system of claim 1, wherein said shared data comprise named data objects and wherein said storage data coherency management system further comprises create logic that monitors creation of a named data object by said plurality of processing units in said ones of said plurality of storage units to determine when to notify said ones of said plurality of storage devices sharing said named data object, said coherency management system providing newly created data objects to said ones of said plurality of data storage units in response to said creation.

6. The computer system of claim 1, wherein said shared data comprise named data objects and wherein said storage data coherency management system further comprises a delete logic module that monitors named data object delete operations executed by said plurality of processing units, said coherency management system notifying said ones of said plurality of storage devices that share the deleted named data object of each said delete operation.

7. The computer system of claim 1, wherein said shared data comprise named data objects and wherein said storage data coherency management system further comprises a lookup logic module for monitoring named data lookup operations by one of said plurality of processing units to one or more of said plurality of storage devices sharing the named data object to be retrieved.

8. The computer system of claim 1, wherein said shared data comprise named data objects and wherein said storage data coherency management system further comprises a data item modify logic that monitors named data object modification operations by said plurality of processing units in said plurality of storage devices.

9. The computer system of claim 1, wherein said shared data comprise named data objects and wherein said storage data coherency management system further comprises messaging logic that informs said ones of said plurality of storage devices of changes in the condition of data objects stored in one of said plurality of storage devices.

10. The computer system of claim 1, wherein each of said plurality of storage devices comprises a respective coherency manager unit that manages state transitions of data stored in each one of said plurality of storage devices.

11. The computer system of claim 10, wherein each coherency manager provides data that associates a state with each named data object cached in said plurality of storage devices.

12. The computer system of claim 11, wherein said state is manipulated and referenced by said storage data coherency management system.

13. A distributed storage cache system for maintaining data coherency, comprising:
a plurality of data storage units;
a plurality of data requesting units in communication with said plurality of data storage units, each said data requesting device being one of a host computer node and an application program; and
a data coherency system for maintaining data coherency in said plurality of data storage units, said coherency management system monitoring said plurality of data storage devices and detecting state changes and data updates to shared data stored in said storage devices, wherein said data coherency system notifies ones of said plurality of said processing units that contain said copies of said shared data of said state changes and said data updates when said state changes and said data updates occur, such that said plurality of data storage units are not required to monitor either of address and bus lines of adjacent ones of said plurality of storage units to detect data updates of shared data among different ones of said plurality of storage units.

14. The system of claim 13, wherein a first one of said plurality of data requesting units initiating a request to data shared among two or more of said plurality of data storage units is a home node and arbitrates the state of said shared data at any time during a data write operation.

15. The system of claim 13, wherein said each of said plurality of data storage units is in communication with a corresponding data coherency manager that interacts with said data coherency system to notify its respective one of said plurality of data storage units of a state change of said shared data.

16. The system of claim 13, wherein none of said plurality of data storage units monitors the status of copies of said shared data stored in said ones of said plurality of data storage units.

17. The system of claim 13, wherein said data coherency system further comprises a state machine module that monitors transition states of named data object as said named data object is accessed from said plurality of storage devices by said plurality of data requesting units, wherein said transition states include modified, exclusive, shared, and invalid.

18. The system of claim 13, wherein said data coherency system further comprises data state association logic that associates a unique state to said shared data in said plurality of data storage units.

19. The system of claim 13, wherein said data coherency system further comprises create data item logic that monitors named data objects created by said plurality of data requesting units in said plurality of data storage units and notifies the ones of said plurality of data storage units that will share said named data object of creation of said created named data objects.

20. The system of claim 13, wherein said data coherency system further comprises delete data item logic that monitors named data object delete operations executed by said plurality of processing units in said plurality of storage units in order to notify the ones of said plurality of storage units that share the deleted named data object.

21. The system of claim 13, wherein said data coherency system further comprises lookup data item logic that monitors named data lookup operations by said plurality of data requesting units to one or more of said plurality of data storage units sharing the named data object to be retrieved.

22. The system of claim 13, wherein said data coherency system further comprises data item modify logic that monitors named data object modification operations by said plurality of data requesting units in said plurality of data storage units.

23. A method of maintaining data coherency in a distributed storage device network which includes a plurality of storage devices, a plurality of requestors and main memory, said method comprising:

monitoring each of said plurality of storage devices for changes, each said changes each comprising one of a creation, a modification, a state change, and a deletion of a data object;

and notifying said each change to ones of said plurality of storage devices sharing said data object when said changes occur; and wherein each of said plurality of storage devices do not independently monitor address and bus lines of adjacent storage devices to maintain data coherency of shared data.

* * * * *